(12) United States Patent
Agrawal et al.

(10) Patent No.: US 9,369,572 B2
(45) Date of Patent: Jun. 14, 2016

(54) INFORMATION SHARING FOR THIRD PARTY APPLICATIONS IN CELLULAR TELECOMMUNICATION INFRASTRUCTURE

(71) Applicant: International Business Machines Corporation, Armonk, NY (US)

(72) Inventors: Dakshi Agrawal, Monsey, NY (US); Michael G. Hill, Fort Lauderdale, FL (US); Sihyung Lee, Seoul (KR); Mudhakar Srivatsa, White Plains, NY (US); Dinesh C. Verma, New Castle, NY (US); Petros Zerfos, New York, NY (US); Joseph W. Ziskin, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/470,191

(22) Filed: Aug. 27, 2014

(65) Prior Publication Data

US 2014/0364096 A1 Dec. 11, 2014

Related U.S. Application Data

(62) Division of application No. 13/618,167, filed on Sep. 14, 2012, now Pat. No. 8,825,022.

(51) Int. Cl.
*H04M 3/42* (2006.01)
*H04L 29/08* (2006.01)
*H04W 4/18* (2009.01)
*H04W 4/02* (2009.01)

(52) U.S. Cl.
CPC ......... *H04M 3/42178* (2013.01); *H04L 67/306* (2013.01); *H04W 4/18* (2013.01); *H04W 4/02* (2013.01)

(58) Field of Classification Search
CPC . H04L 29/08108; H04W 8/245; H04W 12/06
USPC ...................... 455/414.1, 418, 411
See application file for complete search history.

(56) References Cited

U.S. PATENT DOCUMENTS

| | | | |
|---|---|---|---|
| 2003/0097451 A1 | 5/2003 | Bjorksten et al. | |
| 2004/0203663 A1 | 10/2004 | Boman et al. | |
| 2007/0282739 A1* | 12/2007 | Thomsen | G06Q 20/10 705/39 |
| 2008/0263633 A1 | 10/2008 | Banga et al. | |
| 2008/0310446 A1 | 12/2008 | Bellwood et al. | |
| 2009/0197616 A1 | 8/2009 | Lewis et al. | |
| 2009/0298505 A1 | 12/2009 | Drane et al. | |
| 2010/0318426 A1 | 12/2010 | Grant et al. | |
| 2011/0022468 A1 | 1/2011 | Muster et al. | |
| 2011/0060648 A1* | 3/2011 | Weaver | G06Q 30/0251 705/14.49 |
| 2011/0117183 A1* | 5/2011 | Nemunaitis | C12N 15/1135 424/450 |
| 2011/0264498 A1 | 10/2011 | Grant et al. | |
| 2012/0179620 A1* | 7/2012 | Fliderman | G06Q 10/0832 705/332 |
| 2013/0073388 A1* | 3/2013 | Heath | G06Q 50/01 705/14.53 |
| 2013/0132854 A1* | 5/2013 | Raleigh | G06F 3/0482 715/738 |
| 2014/0155025 A1* | 6/2014 | Parker | H04W 4/24 455/406 |

* cited by examiner

*Primary Examiner* — Danh Le
(74) *Attorney, Agent, or Firm* — Scully, Scott, Murphy & Presser, P.C.; Jennifer Davis, Esq.

(57) ABSTRACT

A method, system and computer program product are disclosed for providing content to a communications device. In an embodiment of the invention, a communications network receives a first content portion from a content provider and sends the first content portion to the communications device. The communications network also sends a second content portion to the communications device, and this second content portion is customized for the user of the communications device based on selected information about the user that the communications network has. In one embodiment, the communications network uses the selected information about the user to customize the second content portion for the user, and sends the customized second content portion to the communications device. In an embodiment, the communications network sends the selected information to the content provider, and the content provider uses the selected information to customize the second content portion.

1 Claim, 7 Drawing Sheets

INFORMATION SHARING FOR THIRD PARTY APPLICATIONS IN CELLULAR TELECOMMUNICATION INFRASTRUCTURE

CROSS REFERENCE TO RELATED APPLICATION

This application is a divisional of co-pending patent application Ser. No. 13/618,167, filed Sep. 14, 2012, the disclosure of which is hereby incorporated herein by reference in its entirety.

BACKGROUND

This invention generally relates to mobile communications, and more specifically, to sharing information in cellular telecommunications infrastructures.

Mobile communications has become very widespread, and its use is expected to increase rapidly and substantially. In mobile communications, a variety of devices, such as cell phones, smart phones, and personal digital assistants, are used to receive many types of content including music and video programs.

Mobile communications often involve three parties—the user of the mobile communications device, the operator of the mobile communications network, and a third party that provides the content. In this operation, the mobile communications network operator may have information, such as the location of the user of the communications device that might be useful to the content provider. However, for various reasons, the network operators are reluctant to share this information with the content providers.

The content providers might find this information useful for a number of reasons. For instance, this information might allow the content providers to better target content to particular users—that is, to send specific content to users that have a particular interest in that content. Targeting content is useful in a number of contexts such as mobile marketing. In mobile marketing, as with marketing in general, a population may be segmented into groups, and each person receives advertisements and other marketing information based on which segment of the population that person is in.

Geographic segmentation is one of the three most common ways of segmenting a market for targeted marketing (the other two are demographic and psychographic segmentation). Mobile marketing is a term applied to marketing via handheld devices such as cellphones, iPAD and other tablets, ebook readers, etc. For mobile marketing, in addition to the traditional geographic information (home address), the current and past locations of the user also are important for targeted marketing since these locations hint at demographic and psychographic segmentation of the user, in addition to indicating proximity of users to nearby business opportunities (e.g., a shopping mall or a boutique shop).

A mobile network operator (MNO) is in the best position to have all relevant geographical information about a user and therefore do the best in target marketing. However, MNOs offer a limited set of mobile applications due to various reasons (technical expertise, sales force enablement, business constraints, etc.) and yield to third parties to provide applications that run on top of their cellular infrastructure. As a result, MNOs have not been able to use fully the information that they have. For a number of reasons, MNOs cannot easily monetize their information by sharing it with third party application providers. For instance, the MNOs may not be able to sell geographical information about a customer on a per transaction basis because once the information is released to the third party, the third party can use the information for multiple transactions, depriving the MNOs of recurring revenues.

As opposed to the dilemma faced by the MNOs (they cannot use information themselves and they cannot sell the information to third parties), some third party content providers, referred to as over-the-top (OTT) providers, are in very good position to offer target marketing. For example, some providers can cross-link data gathered from mobile devices (including location information collected without the help of a cellular infrastructure, e.g., location information generated by exploiting wifi access point localization or by GPS) to data collected by their online services (calendar/contact/email/map services). Many mechanisms for cross linking information are used, starting from tracking cookies, to IP address mapping (most broadband providers keep IP addresses fixed for a home for long durations), to mining the web. This cross-linking of information is sufficiently powerful to unmask the real identity of users (that lies behind the pseudo-names created by users for email accounts or when anonymously using services such as YouTube or Google map) and it can be used to serve target advertisements to the customers. However, not all OTT providers have these capabilities and therefore these OTT providers are at a competitive disadvantage.

BRIEF SUMMARY

Embodiments of the invention provide a method, system and computer program product for providing content to a communications device. In an embodiment of the invention, a communications network receives a first content portion from a content provider and sends the first content portion to the communications device. The communications network also sends a second content portion to the communications device, and this second content portion is customized for the user of the communications device based on selected information about the user that the communications network has.

In one embodiment, the communications network uses the selected information about the user to customize the second content portion for the user, and sends the customized second content portion to the communications device.

In an embodiment, the communications network receives the second content portion from the content provider before the second content portion is customized for the user, and the content provider is not given the selected information.

In one embodiment, the communications network obtains at least some of the selected information from the user.

In one embodiment, the communications network has a database of information about the user, and the communications network obtains current information about the user. The communications network combines the obtained current information with information in said database to generate a profile for the user, and uses this profile to customize the second content portion for the user.

In an embodiment, the communications network sends the selected information to the content provider, and the content provider uses the selected information to customize the second content portion.

In one embodiment, the communications network receives the customized second content portion from the content provider and sends the customized second content portion to the communications device.

In an embodiment, the content provider uses the selected information about the user to customize the content, and sends the customized content to the communications device via the communications network.

In an embodiment, the communications network maintains a database of information about the user, and the content provider obtains the selected information from this database.

In an embodiment, the content provider sends an inquiry to the communications network, and the content provider receives the selected information from the communications network in response to this inquiry.

Embodiments of the invention provide a way by which MNOs can share information such as geographic information with third parties without the MNOs losing control over that information, thus ensuring recurring per transaction revenue for the MNOs. Embodiments of the invention eliminate the competitive disadvantage of many small third party application providers, which are otherwise at a disadvantage to many large content providers.

Embodiments of the invention enable MNOs to share, for example, geographical information with third parties via a secure, privacy-preserving service. This service can be manifested as a web-service in services oriented architecture, or as an application interface for third party applications, or as a DB interface, etc. The secure, privacy-preserving service provides real time location information to third parties without relying on GPS being activated on the user device and without revealing the actual user ID.

DETAILED DESCRIPTION

Figure 1:
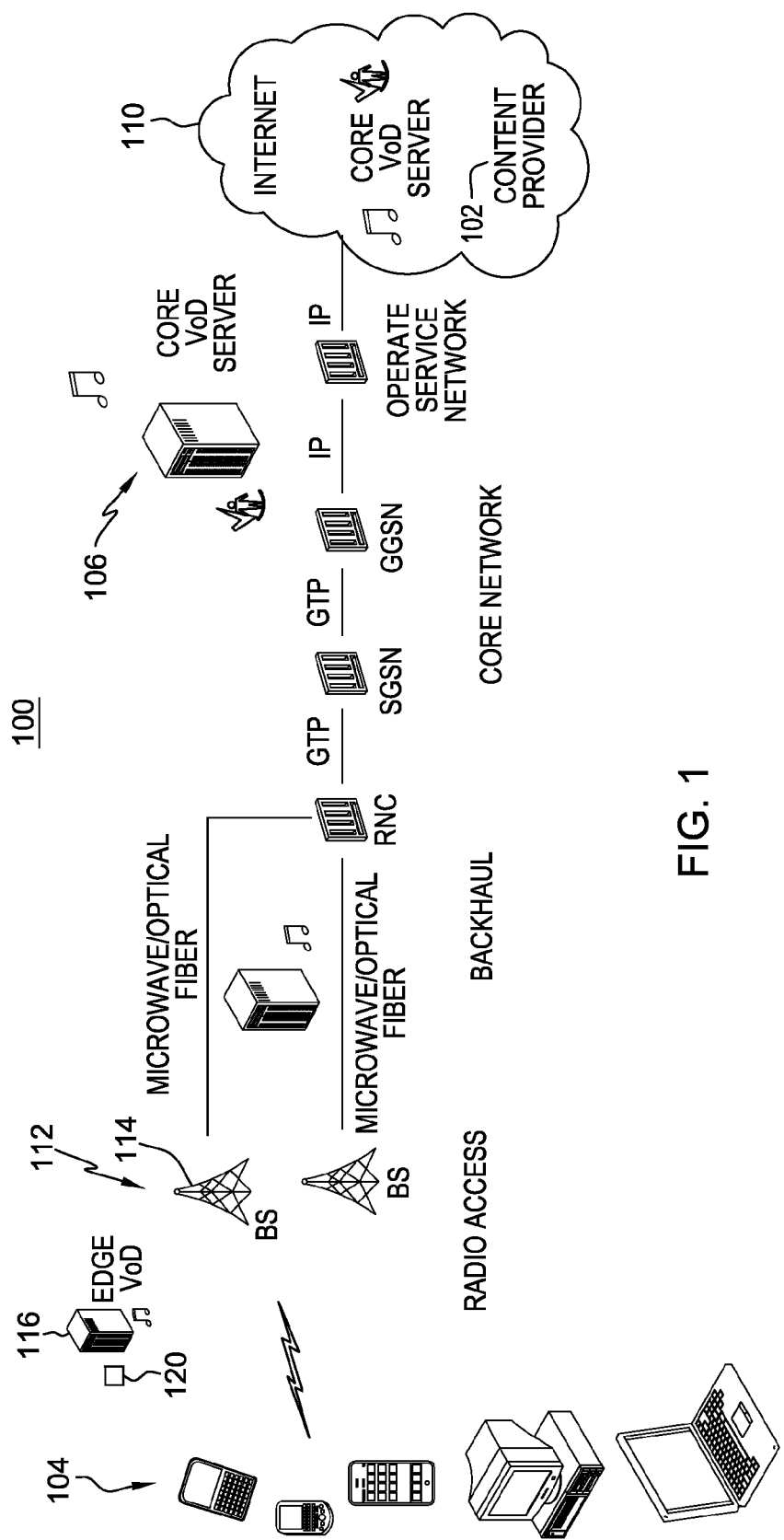
FIG. 1 illustrates a mobile communications environment that may be used in embodiments of the invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention, generally, relates to distribution of content via a mobile communications network, and FIG. 1 illustrates a communications environment 100 that may be used in the implementation of embodiments of the invention. The content may be provided by content providers represented at 102 and may be sent to telecommunication devices 104 via a core telecommunications network 106. In the example environment depicted in FIG. 1, the content provider 102 sends the content to the core telecommunications network 106 over a distributed network 110 such as the Internet. The core telecommunications network 106, in turn, transmits the information to the communication devices 104 through a series of base stations 112.

The core telecommunications network 106 (e.g., in an LTE architecture) is employed to facilitate communications between communication devices, such as cellular phones and laptop computers. The core telecommunications network can comprise various components, such as a Serving Gateway (SGW) and a Packet Data Network Gateway (PDN-GW), to facilitate providing connectivity for the communication devices 104 and to route data to and from those communication devices.

The core telecommunications network 106 also can allocate resources to the communication devices 104, convert or enforce protocols, establish and enforce Quality of Service (QoS) for the mobile devices, provide applications or services in the network, translate signals, and perform other desired functions to facilitate system interoperability and communications in the wireless communication network. The core telecommunications network 106 can include components such as routers, nodes, switches, interfaces, and controllers, which can facilitate communications of data between communication devices in the core telecommunications network. The core telecommunications network, as mentioned above, can include a serving gateway (SGW) that can be directly or indirectly connected to the base stations 112. The SGW can route data packets to and from the mobile devices and from and to other communication devices and also can act as a mobility anchor during inter-base station handovers and as a mobility anchor between LTE and other 3GPP technologies.

Each of the communication devices 104 is operatively connected to one of the base stations 112. Each base station serves a respective coverage area or cell, and each base station can service communication devices located in the respective area covered by the base station. The communication devices can be connected to the base stations and can communicate wirelessly using a variety of technologies, including, for example, cellular, Wi-Fi, Wi-Max, and wireless area networks (WLANs).

Each base station includes a radio transmitter 114, a video server 116 and a local cache 120. The video server is responsive to user content requests and commands and also serves to control communication with one or more remote caches and storage of video content received from the remote caches. The local cache 120 is used to store program content. Processing of normal play content received from a remote server may occur in the video server or in the local cache. In some implementations, the local cache is implemented as a content store and includes processing logic, e.g., a CPU and control routine, responsible for performing various cache management, content storage, processing and retrieval functions as well as storage, e.g., one or more disk drives or other storage devices for storing program content.

FIG. 1 is only an example of a communications environment that may be used in embodiments of the invention, and many other communication environments may be used in embodiments of the invention. Other communication environments having more or fewer items than are shown in FIG. 1 may be used, and other communication environments may be used that have different arrangements of the items shown in FIG. 1. For instance, embodiments of the invention might not require that the video servers and the local caches be placed at the base station 112. Moreover, other content servers than video servers and their respective caches (e.g. web server and web caches, etc.) can be used in other embodiments of the invention.

A wide variety of communication devices 104 may be used in embodiments of the invention. For example, mobile devices that may be used in embodiments of the invention may include portable phones, such as cell phones or the like, a smart phone, a Session Initiation Protocol (SIP) phone, a video phone, a portable email device, a thin client, or a portable gaming device. Mobile communication devices may also be, as additional examples, tablet computers and single-purpose mobile devices (such as eBooks). Other communication devices that may be used in embodiments of the invention include, as examples, personal computers, workstations, and laptop computers.

The communication devices 104 are in wireless communication with the core telecommunications network 106 through the base stations 112 in accordance with protocols as known by those skilled in the art. Each base station has an antenna whose radio coverage is typically tuned to a specific geographic area. As will be understood by those skilled in the art, there need not necessarily be a one-to-one correspondence between cellular towers and geographic areas, in that multiple cellular towers may cover one area and one cellular tower may cover multiple areas.

As mentioned above, in FIG. 1, the content provider is represented at 102. Many specific types of content providers that provide a wide range of specific content may use or be used in embodiments of the invention. The content provided by these providers may include video content such as television programming and movies, as well as other types of content. The content may be of various types and relate to various subjects such as, for example, entertainment, shopping, financial services, gaming, auctions, and many others.

In the example shown in FIG. 1, the content provider 102 sends information to the core telecommunications network 106 over the Internet. The Internet is a worldwide collection of computer networks and gateways that use the TCP/IP suite of protocols to communicate with one another. At the core of the Internet is a backbone of high speed data communication lines between major nodes or host computers comprised of thousands of commercial, government, education, and other computer systems that route data and messages. The present invention, it may be noted, may be implemented with a number of other types of distributed networks, such as, for example, an intranet, a local area network (LAN) or a wide area network (WAN), and the invention may be used with other protocols besides TCP (e.g., UDP, RTP, IP-in-IP (tunneling) etc.). The Internet shown in FIG. 1 is intended as an example of a distributed network and not as a limitation of the present invention.

In accordance with embodiments of the invention, mobile network operators (MNOs) share geographical information with third parties such as content providers 102 via a secure, privacy-preserving service. This service can be manifested as a web-service in services oriented architecture, or as an application interface for third party applications, or as a DB interface, etc. The secure, privacy-preserving service provides real time location information to third parties without relying on GPS being turned on the user device and without revealing the actual user ID.

Figure 2:
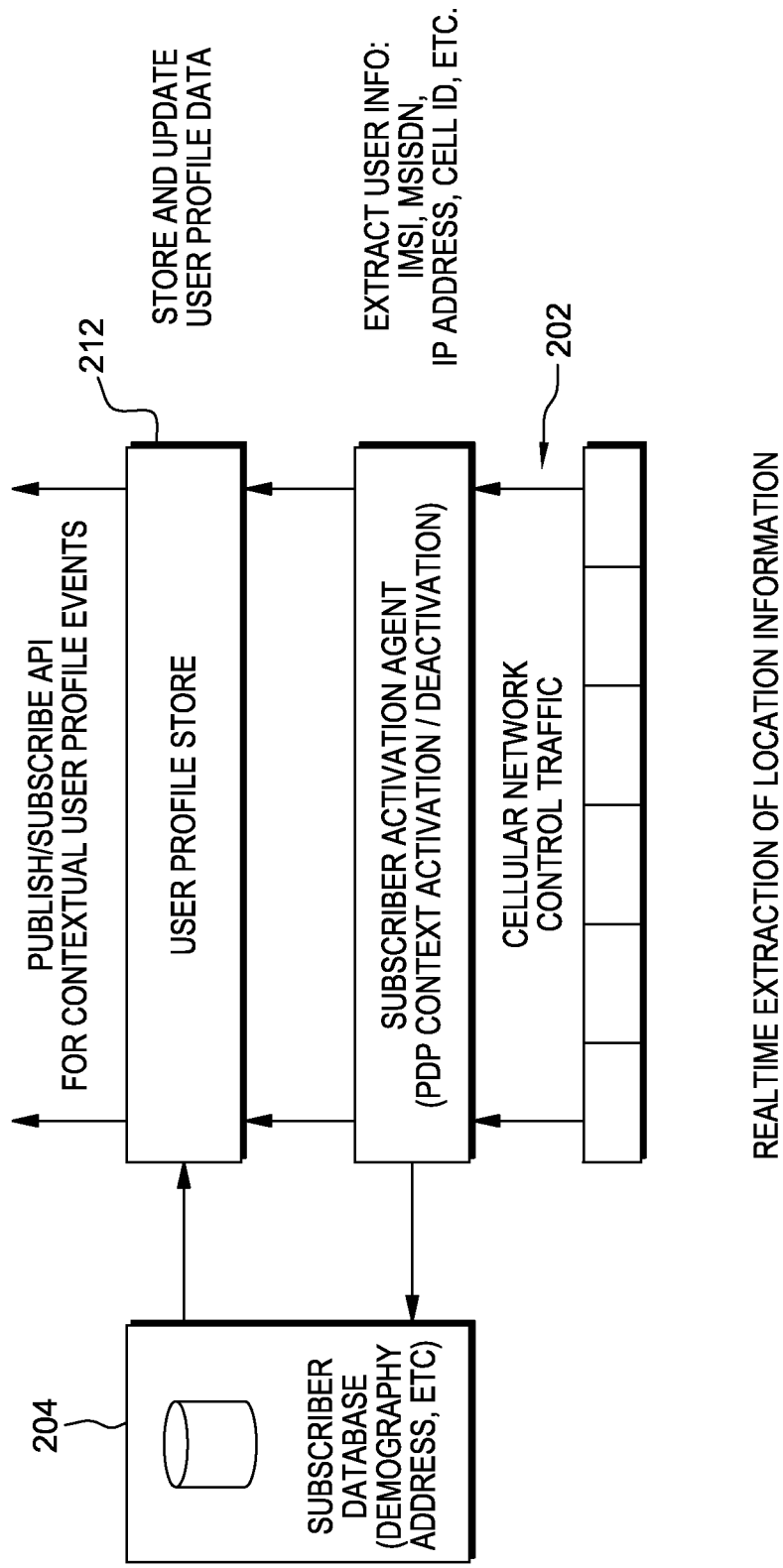
FIG. 2 shows various functions performed in embodiments of the invention.

With reference to FIGS. 1 and 2, to provide a secure, privacy-preserving, location information service to third parties, the MNO analyses cellular network control traffic 202 to determine user location. The analysis of the control traffic can be performed at the base station or at a radio network controller (RNC). This real-time or near real time fresh information is combined with a user database 206 that has historical information to create a user profile store 212. The user location information is also committed to the user database for future references and aggregations. Each user profile may contain information such as their home address, their location, their current location history, their payment history, their interests, etc.

There are multiple models of sharing information between the user profile store and third party applications in such a way that certain attributes of user information are kept private from the third party applications. Techniques for aggregating historical information with fresh near real time information are available in the state of art, e.g., incremental algorithms for maintaining statistics on data, windowing operations to recall most recent actions, top k lists, etc.

Embodiments of the invention share this information with the third parties and provide a system that enables this sharing.

Figure 3:
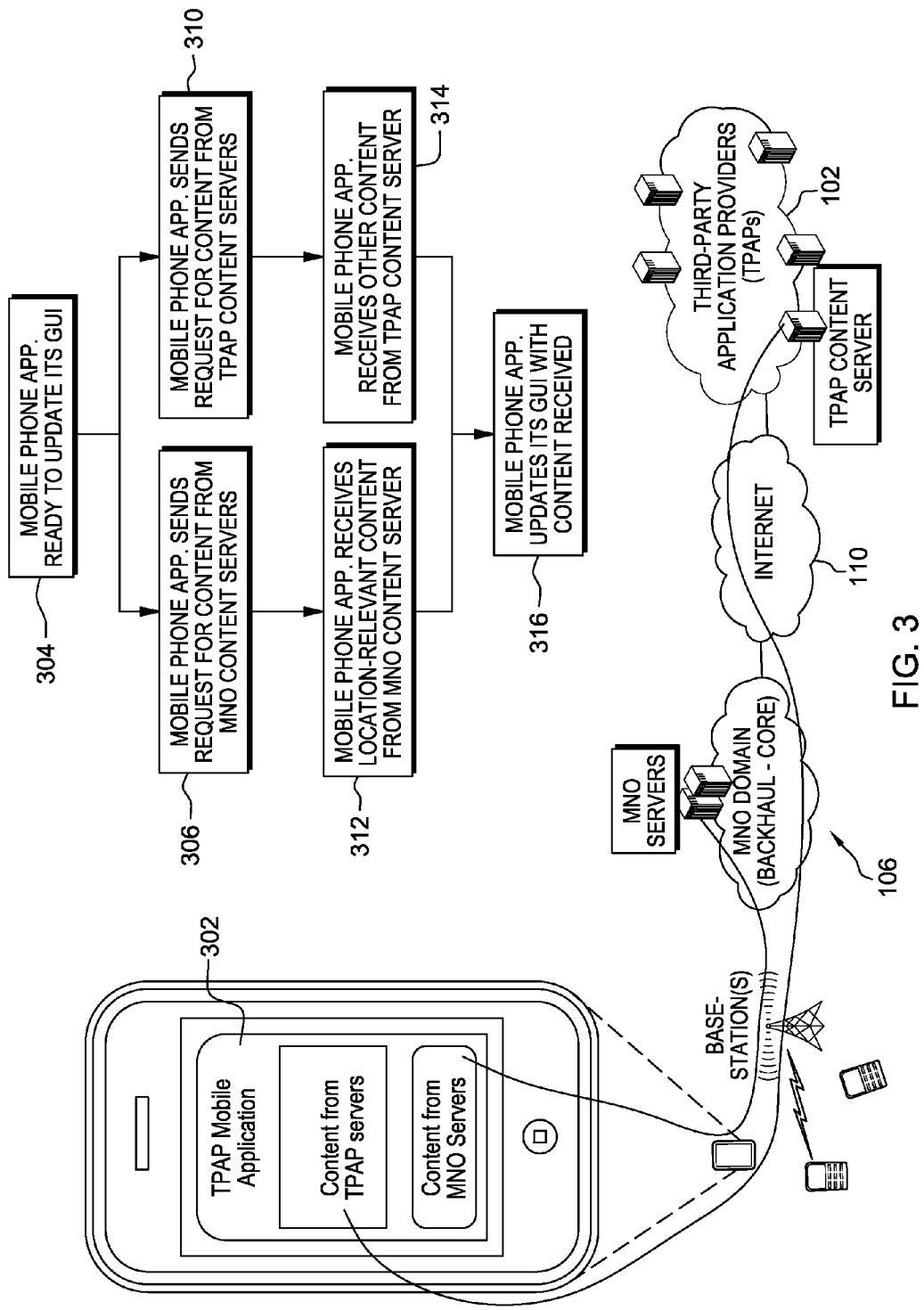
FIG. 3 depicts an embodiment of the invention in which a third party application provider and a mobile network operator share screen space on a user's mobile communications device.

FIG. 3 illustrates an embodiment of the invention. In this embodiment, the third party application provider (TPAP) creates an application to attract user attention and time focused on the cell phone screen, and the TPAP shares some space on the screen with the MNO. The location based portion of the content is served by the MNO in its share of the screen space and the rest of the screen space is served by the TPAP. The TPAP works to attract users and the MNO serves relevant information, and both the TPAP and the MNO share the revenues. This is completely privacy preserving as location information is never shared with the third party. This can be done, for example, by using techniques similar to those known in the art to share the screen space between a frame/applet/portlet etc. With this embodiment, the TPAP and the MNO benefit, where both the TPAP and the MNO use their skills and expertise and share resulting revenues.

In this embodiment, to preserve a distinction between their services and products, the TPAP and the MNO may agree on how the content should be coordinated in their respective portions of the screen. As one example, there could be very little coordination (as an example, the MNO is free to show any banner add in its' screen space). In contrast, as another example, the two screen spaces could be very closely coordinated (for example, the MNO and the TPAP share style sheets, etc.) so that the content provided by the TPAP and the content provided by the MNO are indistinguishable to the end user.

In this embodiment, as an example, the mobile device application 302 indicates, at 304 that the mobile device is ready to update its graphical user interface. This may be done, as represented at 306, by sending a request for content from the MNO content services, and as represented at 310, by sending a request for content from the TPAP content serves at 312, device 302 receives location-relevant content from the MNO content server, or at 314, the mobile device receives other content from the TPAP content serves, at 316, the mobile device 302 updates its graphical user interface with the received content.

Figure 4:
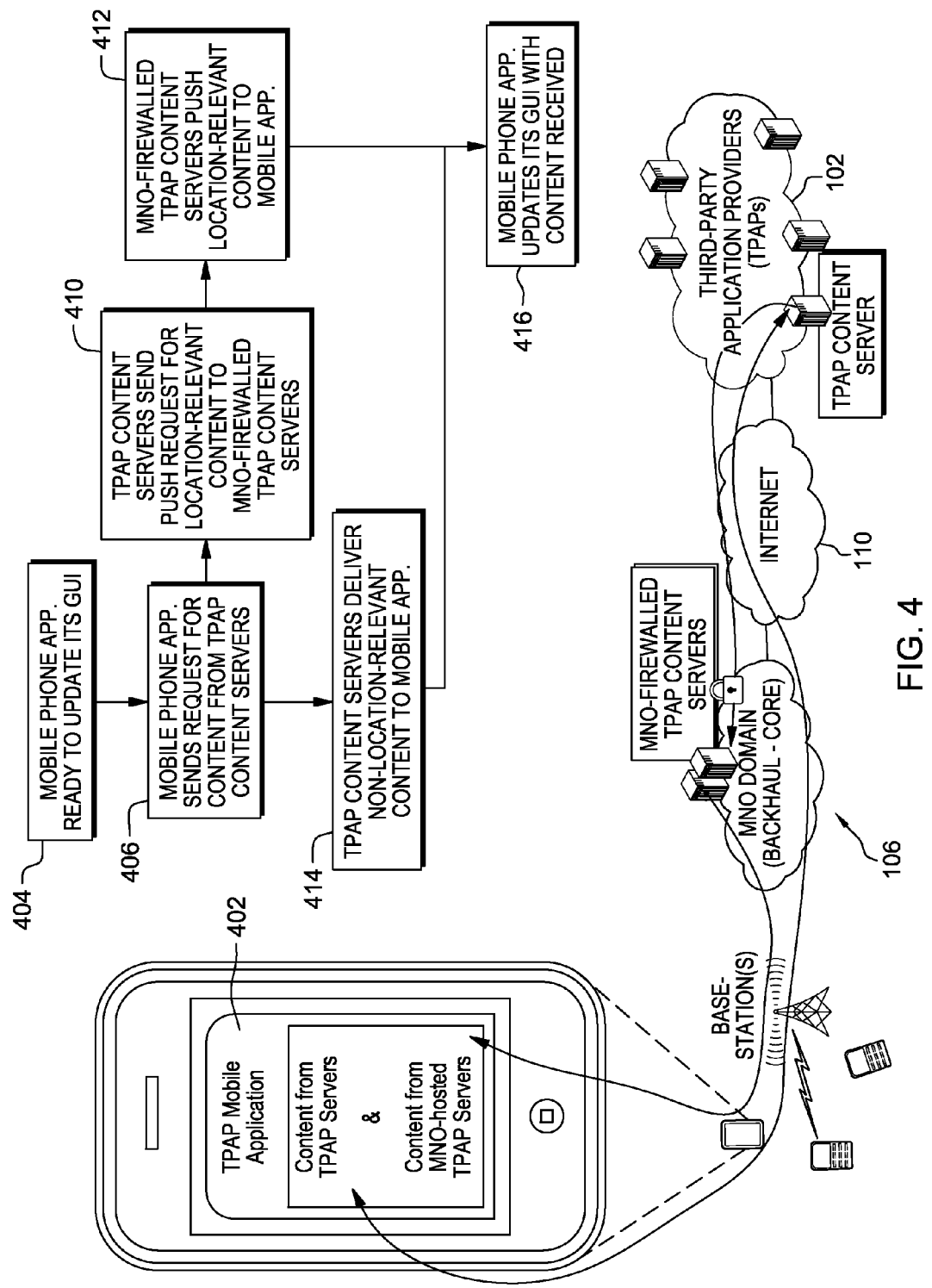
FIG. 4 illustrates an embodiment of the invention in which content from the third party application provider is pulled onto the user's mobile device.

FIG. 4 shows an embodiment of the invention. In this embodiment, the third party serves all the content, however the portion of the content that provides location based information is secured behind a firewall in the cellular provider infrastructure. In an embodiment, the third party can only send information in one direction, towards the mobile device only, using certain protocols with limits to ensure the user information remains in the cellular provider infrastructure. For example, the content provider may send content to the MNO, and the MNO may store this content in a server or servers controlled by the MNO. Specifically, the MNO controls access to each of these services. These services may also include location based information about the users of the mobile communications devices, and this location based information may be used or combined with, or used to adjust or modify, the content received from the TPAP. The TPAP may have write access but not read access, to these MNO servers. For instance, in an embodiment, the third party application provider only provides non-cookie setting, plain HTMO pages (which can be dynamically constructed by the user's communication device).

Figure 5:
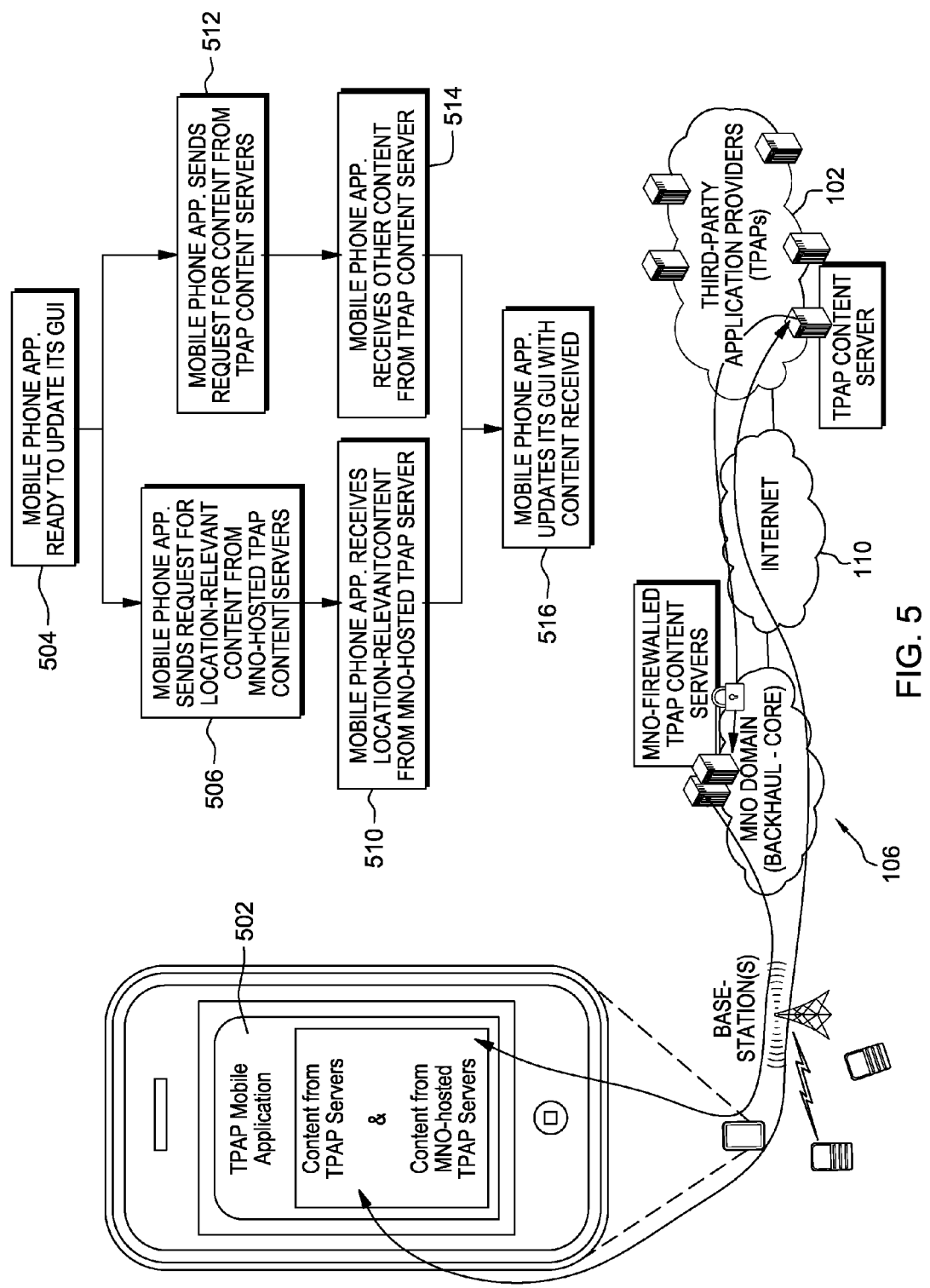
FIG. 5 illustrates an embodiment of the invention in which content from the third party application provider is pushed onto the user's mobile communications device.

FIGS. 4 and 5 show two embodiments of methods for obtaining information from the MNO-firewalled third-party application provider content server. FIG. 4 illustrates a push method, according to which the mobile phone application sends a request for location information to the TPAP server, which in turn forwards this request to the MNO-firewalled content server that pushes the location-relevant information to the mobile phone application. FIG. 5 illustrates a pull method, as in the embodiment of FIG. 3, wherein the mobile phone application contacts the content server inside the MNO firewall for location-relevant information.

In an implementation of the embodiment of FIG. 4, as an example, the mobile device application 402 indicates at 404 that the device is ready to update its graphical user interface, and at 406, the mobile device sends a request for content from the TPAP content servers, at 410, the TPAP content server sends a push request for location-relevant content to the MNO-firewalled TPAP content servers, and at 412, the MNO-firewalled TPAP content serves push location-relevant content to the mobile application. Also, at 414, the TPAP content server delivers non-location relevant content to the mobile device application. At 416, the mobile device application updates its graphical user interface with the received content.

As an example, in an implementation of the embodiment of FIG. 5 a mobile phone application 502 indicates, at 504, that it is ready to update its graphical user interface at 506, the mobile device application sends a request for location-relevant content from the MNO-hosted TPAP content services, and at 510, the mobile device application receives location-relevant content from the MNO-hosted TPAP server. In addition, at 512, the mobile phone application sends a request for content from the TPAP content servers; and the mobile device, at 514, receives this other content—that is, content that is not location-relevant—from the TPAP content server, the mobile device application, at 516, updates its graphical user interface with the received content.

Embodiments of the invention may include additional functionalities. For instance, for monitoring and measurement purposes, the portion of the MNO that sends location based information to the mobile phone application may also send selected data to the TPAP (for example, to enable the TPAP to commit to a fixed schema database run by the MNO).

Figure 6:
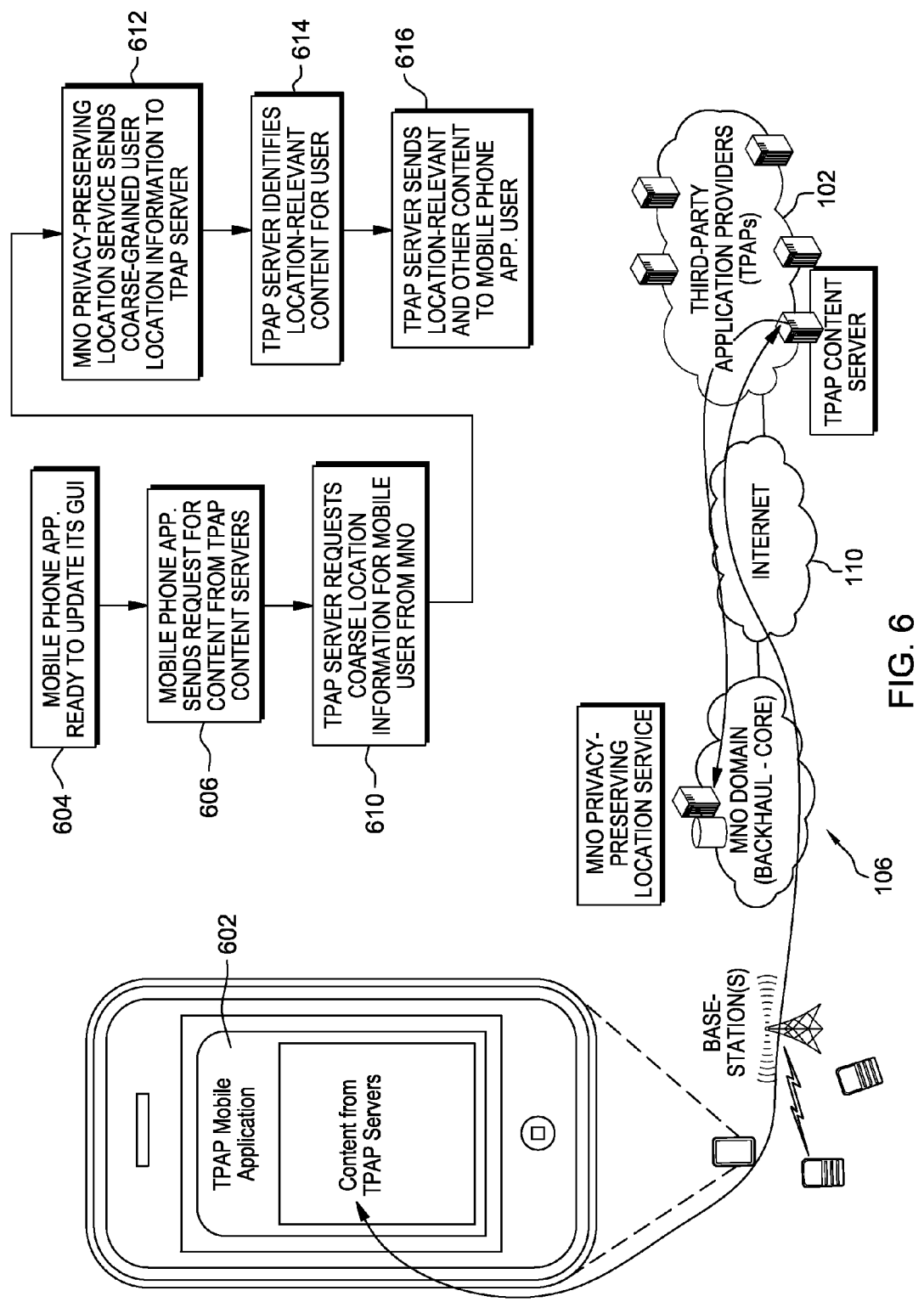
FIG. 6 shows an embodiment of the invention in which general information is shared between the mobile network operator and the third party application provider based on queries from the application provider.

FIG. 6 illustrates an embodiment of the invention. In this embodiment, the TPAP asks a location based query (with sufficient generality to preserve the privacy of the user of the mobile communication device, e.g. is the user a woman currently in the SoHo district of Manhattan) from the MNO. The MNO responds with an answer which is used by the TPAP to customize content for the user's mobile communications device. This may allow some information to be sent form the MNO to the third party application provider, since that third party provider can keep track of the answers form the MNO and associate those answers with a user pseudoname or real identity, depending on the relationship between the TPAP and the customer.

With reference to FIG. 6, in an implementation of the embodiment shown therein, a mobile device application 602 indicates at 604 that it is ready to update its graphical user interface, and at 606, the mobile device application sends a request for content from the TPAP content services, at 610, the TPAP server requests coarse location information for the mobile user from the MNO, and at 612, the MNO sends coarse-grained user location information to the TPAP server, the TPAP, server at 614, identifies location relevant content for the user of the mobile device; and, at 614, the TPAP server sends location-relevant and other content to the mobile device application.

Figure 7:
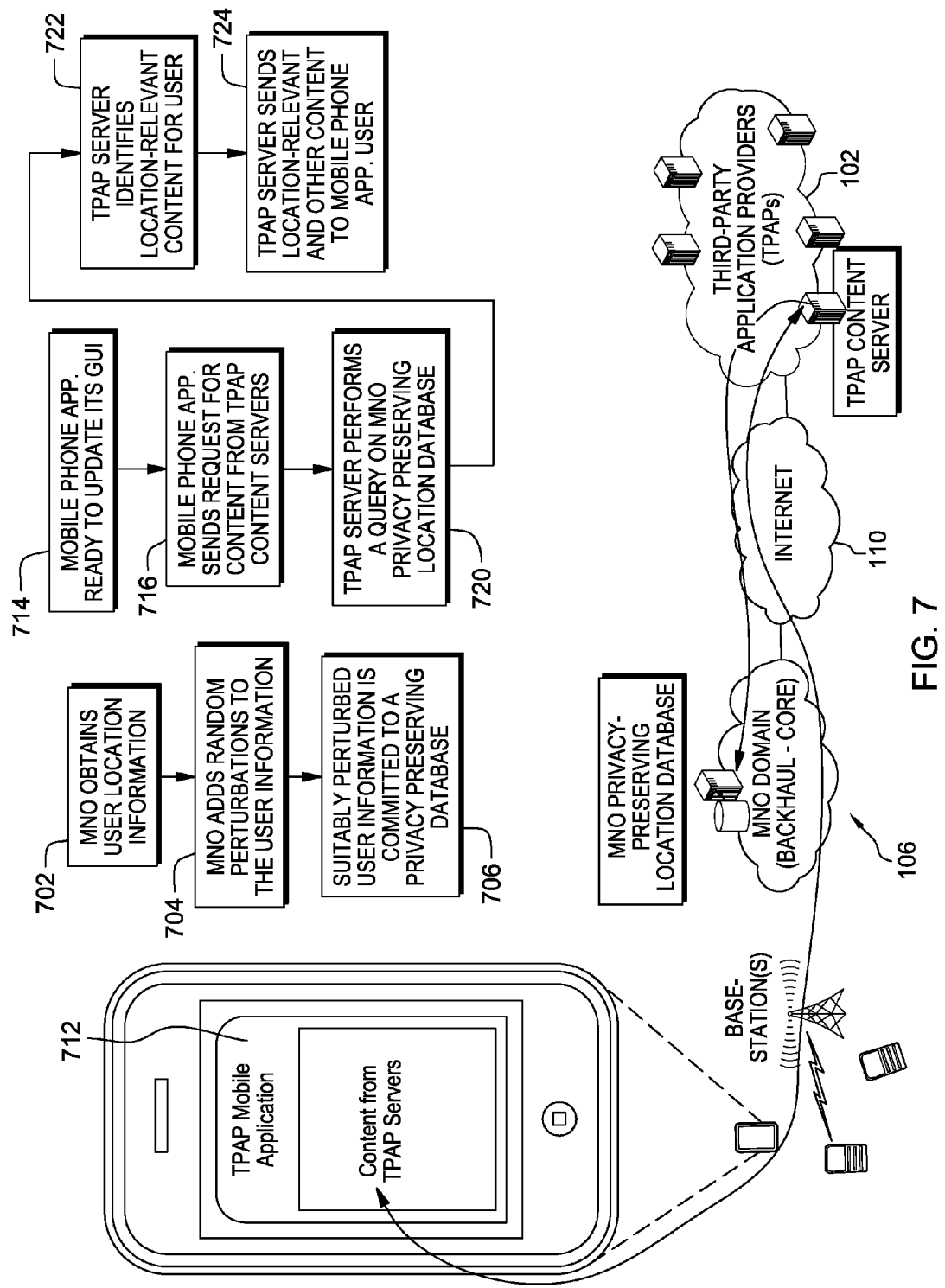
FIG. 7 illustrates an embodiment of the invention in which the third party content provider is given limited access to a database of the mobile network operator.

FIG. 7 illustrates an embodiment of the invention. In this embodiment, the TPAP and the MNO share non-real time general information. In this embodiment, the MNO gives the TPAP access to a database of location information, suitably enhanced with privacy preserving techniques. Suitable privacy preserving techniques are known in the art and can be used by those of ordinary skill in the art. The TPAP is able to data mine this database and to draw conclusions about a demography (a collection of users), but the TPAP cannot draw a conclusion about a particular user.

At 712, a mobile device application 714 indicates that it is ready to update its graphical user interface; and, at 716, the mobile device application sends a request for content from the TPAP content servers. The TPAP server, at 720, performs a query on the MNO privacy preserving location database; and, at 722, the TPAP server identifies location-relevant content for the user. The TPAP server, at 724, sends location-relevant and other content to the mobile device application.

The description of the present invention has been presented for purposes of illustration and description, but is not intended to be exhaustive or to limit the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of managing content for a communications device, wherein a user uses the communications device to receive data via a communications network, and the communications network has selected information about the user, the method comprising:

a content provider sending a first content portion to the communications device via the communications network;

the content provider authorizing the communications network to send a second content portion to the communications device, and wherein said second content portion is customized for the user of the communications device based on the selected information about the user that the communications network has, wherein the authorizing the communications network includes: authorizing the communications network to use the selected information about the user to customize the second content portion for the user, and to send the customized second content portion to the communications device; and the content provider sending the second content portion to the communications network before the second content portion is customized for the user; and wherein:

the content provider is not given the selected information for a given period of time.

\* \* \* \* \*